(12) United States Patent
Yokoyama

(10) Patent No.: US 7,165,819 B2
(45) Date of Patent: Jan. 23, 2007

(54) LIFT TRUCK

(75) Inventor: Koji Yokoyama, Hyogo (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 0 days.

(21) Appl. No.: 11/199,999

(22) Filed: Aug. 10, 2005

(65) Prior Publication Data

US 2006/0025915 A1 Feb. 2, 2006

Related U.S. Application Data

(62) Division of application No. 10/211,336, filed on Aug. 5, 2002.

(30) Foreign Application Priority Data

Aug. 21, 2001 (JP) .......................... P. 2001-250812

(51) Int. Cl.
*B60T 8/64* (2006.01)
(52) U.S. Cl. ...................................... 303/151; 303/152
(58) Field of Classification Search ................ 303/151, 303/152, 22.1, 22.2, 20
See application file for complete search history.

(56) References Cited

U.S. PATENT DOCUMENTS

| | | | |
|---|---|---|---|
| 4,206,829 A | 6/1980 | Melocik | |
| 4,942,529 A | 7/1990 | Avitan et al. | |
| 5,057,728 A * | 10/1991 | Dammeyer et al. | ............ 310/77 |
| 5,340,202 A * | 8/1994 | Day | .............................. 303/19 |
| 5,376,869 A * | 12/1994 | Konrad | ......................... 318/587 |
| 5,637,967 A * | 6/1997 | Kim | ............................ 318/376 |
| 5,666,295 A | 9/1997 | Bruns | |
| 6,116,704 A * | 9/2000 | Nakakita et al. | ............. 303/152 |
| 6,135,694 A | 10/2000 | Trego et al. | |
| 6,170,341 B1 | 1/2001 | Avitan | |
| 6,236,927 B1 * | 5/2001 | Sherman | ....................... 701/70 |
| 6,782,961 B1 * | 8/2004 | Ishikawa et al. | ............. 180/197 |
| 2004/0088099 A1 | 5/2004 | Chess | |

FOREIGN PATENT DOCUMENTS

| | | |
|---|---|---|
| EP | 0 595 445 A2 | 5/1994 |
| EP | 0 664 273 A1 | 7/1995 |
| EP | 0 865 959 A1 | 9/1998 |
| EP | 0 908 348 A2 | 4/1999 |
| GB | 2 357 200 A | 6/2001 |
| JP | 9-233604 A | 9/1997 |
| JP | 11-79594 | 3/1999 |
| SU | 1017656 | 5/1983 |

* cited by examiner

Primary Examiner—Robert A. Siconolfi
(74) *Attorney, Agent, or Firm*—Sughrue Mion, PLLC

(57) ABSTRACT

In a lift truck of a type that, using a brake controller 20, a traveling motor 3 can be braked by an electromagnetic brake 17, the brake controller 20, when it detects the brake operation of a brake operation device, not only actuates the electromagnetic brake 17 but also detects the truck body weight and traveling speed of the lift truck, thereby electrically braking the traveling motor 3 in such a manner that the electric brake force can be increased or decreased in correspondence to whether the thus-detected truck body weight is heavy or light as well as the electric brake force can be increased or decreased in correspondence to whether the thus-detected traveling speed is high or low.

5 Claims, 11 Drawing Sheets

LIFT TRUCK

This is a divisional of application Ser. No. 10/211,336 filed Aug. 5, 2002. The entire disclosure is hereby incorporated by reference.

BACKGROUND OF THE INVENTION

1. Field of the Invention

The present invention relates to a lift truck which is used to load and unload a cargo.

2. Description of the Related Art

Conventionally, as a lift truck, there is widely used a lift truck which comprises a traveling motor for traveling a truck body of the lift truck, an electromagnetic brake for braking the rotation of the traveling motor, a brake operation device to be operated for actuation of the electromagnetic brake, and a brake controller for detecting the brake operation of the brake operation device to thereby actuate the electromagnetic brake.

In one type of conventional lift truck, as the above brake operation device, there is used a brake operation device which is exclusively designed for the brake operation. And, there is also known another type of lift truck in which there is disposed a lever type of steering device which can be operated swingable in the horizontal direction so as to control the traveling direction of the truck body, the steering device is used also as a brake operation device, and the electromagnetic brake is actuated when the brake controller detects that the brake operation device is situated at a given luffing angle.

In both types of conventional lift trucks, the electromagnetic brake can be controlled so as to be on or off and the brake force of the electromagnetic brake is designed such that it can cause the truck body, which is traveling with the maximum load and at the highest speed, to stop within a given brake distance.

However, in the structure in which the brake force of the electromagnetic brake is set at a given level in this manner, in case where an operator operates the brake operation device in a no-load condition where no cargo is present on the lift truck, or in a light-load condition where the cargo on the lift truck is light, the brake works more than necessary to thereby bring the truck body to a sudden stop. Especially, in case where the electromagnetic brake is actuated while the truck body is traveling in the no-load condition or in the light-load condition, the truck body is brought to a sudden stop.

In the light-load condition, this sudden stop can cause the cargo to collapse; or, in a lift truck of a type that an operator gets on the truck body and operate the same, the shock of the sudden stop causes the operator to lose his or her proper position and thus feel uncomfortable; or, there is also a fear that the operator, who has been out of balance due to the sudden stop or due to a reaction to the sudden stop, can unconsciously operate an operation lever by mistake.

Also, in case where the brake force of the electromagnetic brake is set at a given level in this manner, the feeling of the brake varies according to the traveling speeds of the truck body: that is, in the low-speed traveling condition, a sudden stop causes the operator to feel uncomfortable; and, on the other hand, in the high-speed traveling condition, not only the operator can doubt of the brake effect and thus can feel uneasy, but also the operator can be hasty or late in braking.

SUMMARY OF THE INVENTION

The present invention has been made to solve the above problems found in the conventional lift trucks. Accordingly, it is an object of the invention to provide a lift truck which is structured such that the brake force can be increased or decreased in correspondence to whether the cargo on the lift truck is heavy or light, and a lift truck structured such that the brake force can be increased or decreased in correspondence to an increase or a decrease in the traveling speed of the truck body.

In attaining the above object, according to the invention, there is provided a first lift truck (which is hereinafter referred to as a first invention), comprising: a traveling motor for traveling a truck body of the present lift truck; an electromagnetic brake for braking the rotation of the traveling motor; a brake operation device to be operated for actuation of the electromagnetic brake; and, a brake controller for detecting the brake operation of the brake operation device to thereby actuate the electromagnetic brake. And, in order to be able to increase or decrease the brake force in correspondence to whether the cargo is heavy or light, there is employed the following technical means.

That is, the brake controller, when it detects the brake operation of the brake operation device, not only actuates the electromagnetic brake but also detects the truck body weight of the present lift truck, thereby being able to electrically brake the traveling motor in such a manner that the electric brake force can be increased or decreased in correspondence to whether the truck body weight increases or decreases.

Here, the term "the truck body weight" means a weight which is the sum of the dead weight of the truck body and the weight of the cargo. Since the dead weight of the truck body is constant, to determine the truck body weight, the weight of the cargo may be firstly detected and the truck body weight may be then calculated in accordance with the thus-detected cargo weight.

Also, the expression "to electrically brake the traveling motor in such a manner that the electric brake force can be increased or decreased in correspondence to whether the truck body weight increases or decreases" means to electrically brake the traveling motor by varying the brake force in such a manner that, when the truck body weight is small, the brake force of the electric brake can be reduced and, when the truck body weight is large, the brake force of the electric brake can be increased. This includes a case where the brake force is varied step by step including the on/off of the electric brake, a case where the brake force is varied continuously, and a compound case composed of these two cases where, for example, when the traveling speed is equal to or lower than a given speed, the brake force is set constant or is varied step by step, and, when the traveling speed is higher than the given speed, the brake force is varied continuously. By the way, the continuous variation includes a linear variation, a combination of a plurality of linear variations differing in the inclination from one another, a curvilinear variation, and a combination of a linear variation and a curvilinear variation.

According to the first invention, as described above, in braking, the electromagnetic brake is actuated and the traveling motor is electrically braked in such a manner that the electric brake force increases or decreases in correspondence to whether the truck body weight increases or decreases. Thanks to this, the sudden stop of the lift truck when it is braked in a light-load condition as well as the collapse of the cargo due to such sudden stop can be prevented.

Also, in the case of a lift truck of a type that an operator gets on it, the sudden stop of the lift truck when it is braked in a no-load condition and in a light-load condition can be prevented, which can in turn prevent the operator from losing his or her stable posture due to the sudden stop or due to a reaction to such sudden stop. Further, in the first invention, to stop the traveling motion of the lift truck, the electromagnetic brake and the electric brake of the traveling motor are used in combination. This provides an operation effect that the brake force of the present electromagnetic brake can be reduced when compared with that of the conventional electromagnetic brake.

Next, according to the invention, there is provided a second lift truck (which is hereinafter referred to as a second invention), comprising: a traveling motor for traveling a truck body; an electromagnetic brake for braking the rotation of the traveling motor; a brake operation device to be operated for actuation of the electromagnetic brake; and, a brake controller for detecting the brake operation of the brake operation device to thereby actuate the electromagnetic brake. And, in order to be able to increase or decrease the brake force in correspondence to whether the traveling speed is high or low, there is employed the following technical means.

That is, the brake controller, when it detects the brake operation of the brake operation device, not only actuates the electromagnetic brake but also detects the traveling speed of the lift truck, thereby being able to electrically brake the traveling motor in such a manner that the electric brake force can be increased or decreased in correspondence to whether the thus-detected traveling speed is high or low.

Here, the term "the traveling speed" means the absolute value of the traveling speed: that is, in the advancing condition of the lift truck, it means the advancing speed and, in the backing condition, it means the backing speed.

Also, the expression "to electrically brake the traveling motor in such a manner that the electric brake force can be increased or decreased in correspondence to whether the traveling speed is high or low" means to electrically brake the traveling motor by varying the brake force in such a manner that, when the traveling speed is low, the brake force of the electric brake can be reduced and, when the traveling speed is high, the brake force of the electric brake can be increased. This includes a case where the brake force is varied step by step including the on/off of the electric brake, and a case where the brake force is varied continuously. By the way, the continuous variation includes a linear variation and a curvilinear variation. Since the second invention is structured in the above-mentioned manner, according to the second invention, in braking, not only the electromagnetic brake is actuated but also the traveling motor is electrically braked in such a manner that the electric brake force can be increased or decreased in correspondence to whether the traveling speed is high or low. Therefore, the brake force can be varied in correspondence to whether the traveling speed is high or low, that is, in the high traveling speed, the brake force can be increased and, in the low traveling speed, the brake force can be decreased. Also, according to the second invention, as described above, since the electric brake force can be varied in such a manner that as the traveling speed decreases, the brake force can be reduced, the sudden stop of the lift truck when it is braked in the low traveling speed as well as the collapse of the cargo due to such sudden stop can be prevented.

Also, in the case of a lift truck of a type that an operator gets on it, the operator can be prevented from losing his or her stable posture due to the sudden stop of the lift truck or due to a reaction to such sudden stop. Further, in the second invention, since the maximum brake force is the sum of the brake force of the electromagnetic brake and the electric brake force of the traveling motor, the brake force of the electromagnetic brake can be favorably reduced when compared with that of the conventional electromagnetic brake.

Of course, the first and second inventions can be employed in combination. In case where the brake force in the low-speed no-load condition and in the low-speed light-load condition is set smaller than the brake force in the high-speed heavy-load condition, the sudden stop of the lift truck in the low-speed no-load condition and in the low-speed light-load condition can be prevented.

DETAILED DESCRIPTION OF THE PRESENT INVENTION

Now, description will be given below in detail of lift trucks according to the preferred embodiments of the invention, with reference to the accompanying drawings.

Figure 3:
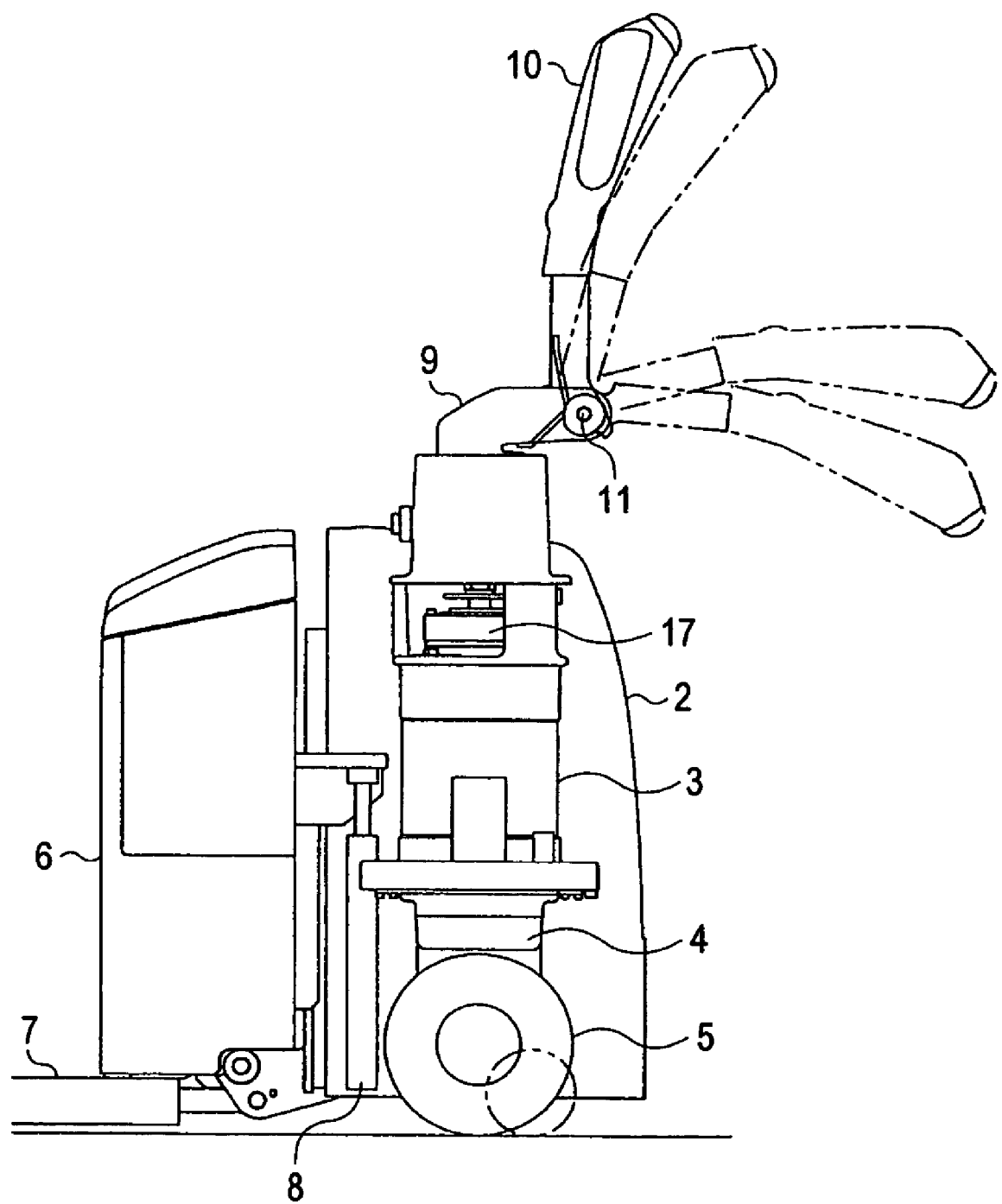
FIG. 3 is a side view of a lift truck according to the first embodiment.

FIG. 3 is a side view of a lift truck according to a first embodiment of the invention. In this lift truck, within a frame case 2 of a truck body 1, there are stored an oil pressure power unit, an oil pressure valve, and a traveling motor 3. Also, on the lower side of the traveling motor 3, there are supported drive wheels 5 through a gear case 4, so that the drive wheels 5 can be driven by the traveling motor 3 through gear trains disposed in the gear case 4.

Further, on the rear side of the frame case 2, there is disposed a battery case 6 for storing therein a battery and a charging device and, on the lower side of the battery case 6, there is fixed a fork 7. And, the battery case 6 and fork 7 are supported on the frame case 2 in such a manner that they can be moved up and down; and, specifically, they can be moved upward by an oil pressure cylinder 8 disposed within the frame case 2.

On the upper portion of the frame case 2, there is supported a steering support 9 in such a manner that it can be swung horizontally and, on the steering support 9, there is supported a device used both as a steering device and a brake operation device (which is hereinafter referred to as a brake operation device) 10 in such a manner that it can be raised and lowered between the vertical and horizontal positions thereof through a support shaft 11.

Figure 4:
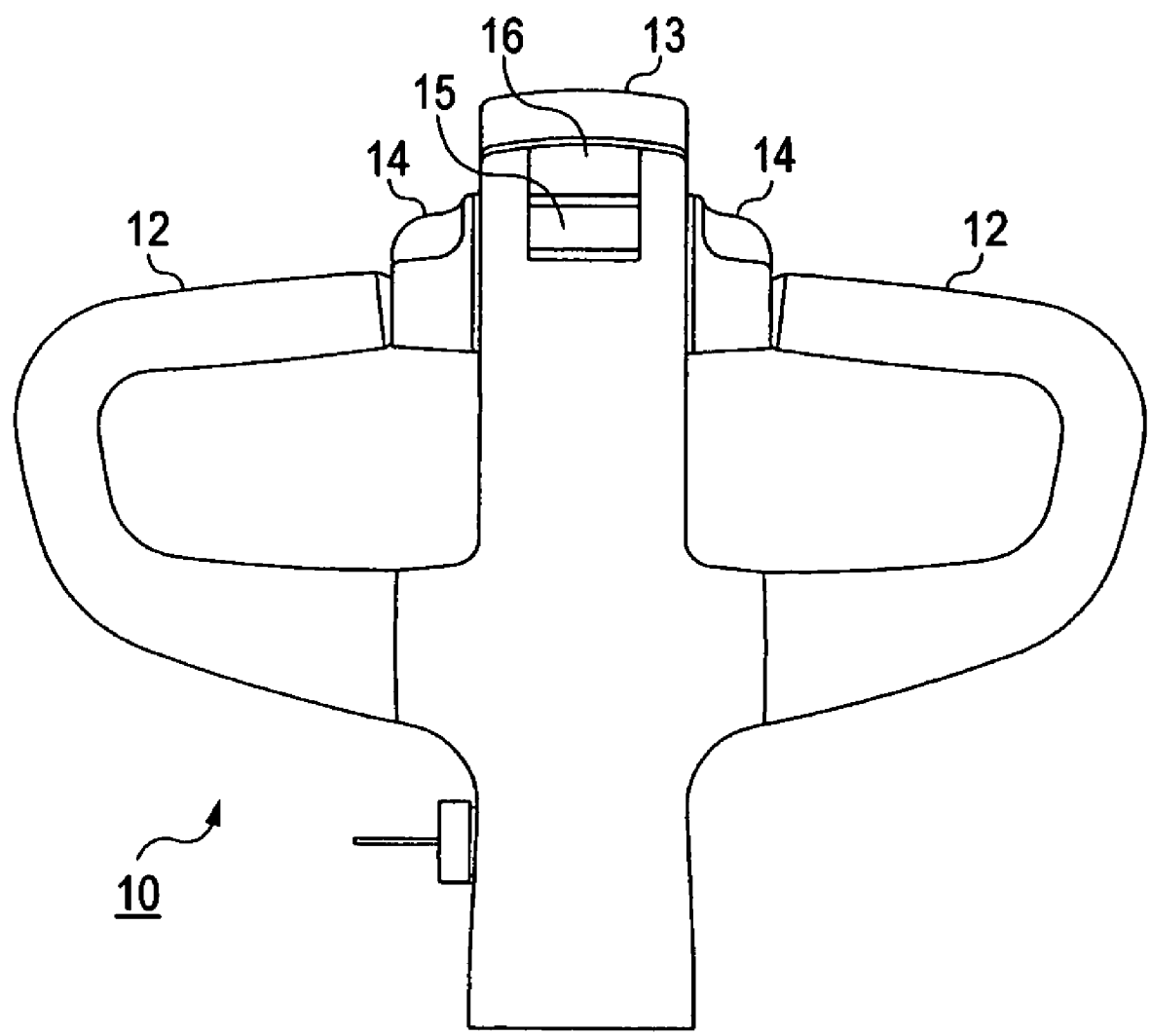
FIG. 4 is a plan view of the leading end portion of an operation device used in the first embodiment.

Now, FIG. 4 is a plan view of the leading end portion of the brake operation device 10 which is lowered down to its horizontal position. As shown in FIG. 4, there are disposed a handle 12 to be gripped by an operator, and an operation part 13. On the operation part 13, there are disposed an advancing/backing accelerator operation device 14 to be operated not only for starting the traveling motor 3 in the advancing direction but also for adjusting the speed of the traveling motor 3, a raising operation device 15 to be operated for raising the fork 7, and a lowering operation device 16 to be operated for lowering the fork 7. Also, as shown in FIG. 3, upwardly of the traveling motor 3, there is disposed an electromagnetic brake 17 for braking the rotation of the traveling motor 3.

Now, referring to the structure of this lift truck, what is the most important, as will be described below, is the provision of a brake controller 20 which, when the brake operation device 10 is raised, for example, up to an angle in the range of 80–90°, or when it is lowered down to an angle in the range of the horizontal position −10°, actuates the electromagnetic brake 17 to thereby brake the traveling motor 3 and, at the same time, electrically brakes the traveling motor 3 in correspondence to the cargo-loaded condition of the lift truck and the traveling speed thereof.

Figure 1:
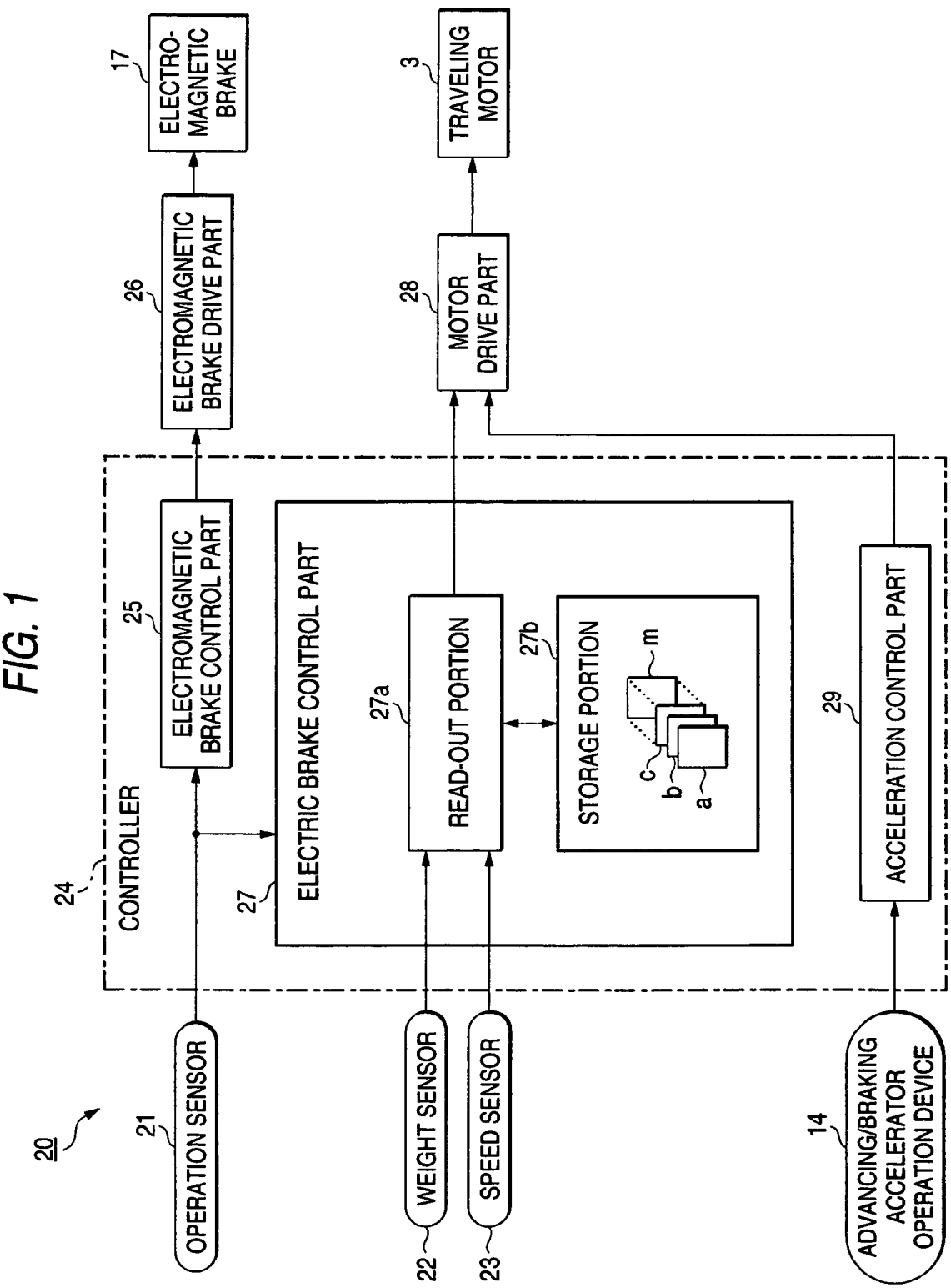
FIG. 1 is a function block diagram of the main portions of a lift truck according to a first embodiment of the invention.

Now, FIG. 1 is a function block diagram of the brake controller 20. As shown in FIG. 1, the brake controller 20 comprises an operation sensor 21 used to detect that the brake operation device 10 is situated at a given position, a weight sensor 22 for detecting the weight of the cargo carried on the fork 7, and a speed sensor 23 for detecting the traveling speed of the lift truck.

Also, the brake controller 20 further comprises a controller 24 for inputting therein the outputs of the operation sensor 21, weight sensor 22, speed sensor 23 and the previously-mentioned advancing/backing accelerator operation device 14, an electromagnetic brake drive part 26 to be controlled by the controller 24, and a motor drive part 28; and, in operation, the electromagnetic brake 17 can be switched on and off by the electromagnetic brake drive part 26, and the traveling motor 3 can be driven or electrically braked by the motor drive part 28.

Figure 5:
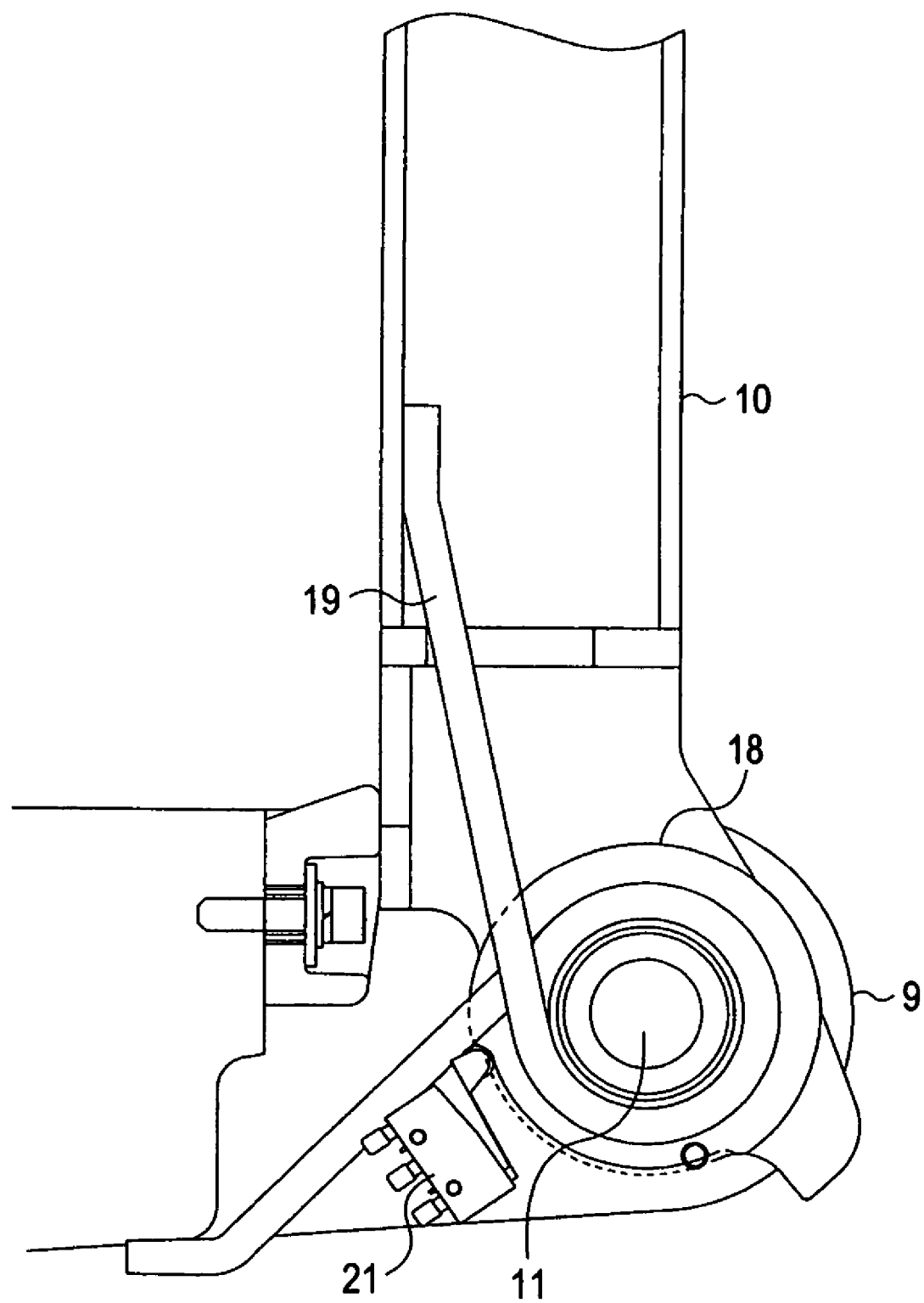
FIG. 5 is a side view of the base end portion of the above operation device.

Now, FIG. 5 is a side view of the base end portion of the brake operation device 10. As shown in FIG. 5, a cam 18 is disposed so as to be continuous with the base end portion of the brake operation device 10. In case where the brake operation device 10 is raised up to the angle in the range of 80–90° or lowered down to the angle in the range of horizontal −10°, the cam 18 opens the operation sensor 21 to thereby turn on the operation sensor 21. In case where the operation sensor 21 is turned on, it detects that the brake operation device 10 is situated at a given position, that is, at a position where the device 10 is raised up to the angle in the range of 80–90° or at a position where it is lowered down to the angle in the range of the horizontal position −10°.

That is, when the brake operation device 10 is situated between a position where it is raised up to its vertical position and a position where it is lowered down to its horizontal position, the cam 18 opens the operation sensor 21 to thereby turn on the operation sensor 21.

However, as a structure to detect that the brake operation device 10 is situated at one of the above two positions, the present structure is not limitative but, for example, there may be another structure which uses two sensors, that is, a sensor for detecting the vertically raised position of the brake operation device and a sensor for detecting the horizontally lowered position thereof. Also, in the present embodiment, as the operation sensor 21 for detection of the position of the brake operation device, there is used a micro switch but this is not limitative, for example, there may also be used a contact operation sensor such as a pressure sensitive sensor, or a non-contact operation sensor such as a proximity switch and a photosensor. Further, there may be used other types of position detect means such as a potentiometer.

By the way, the brake operation device 10 can be energized by a spring 19 in a direction where the brake operation device 10 is raised to its vertical position and, in case where the operator lets go of the brake operation device 10, the spring 19 raises the brake operation device 10 up to its vertical position.

The weight sensor 22 shown in FIG. 1 is composed of, for example, an oil pressure sensor which is used to detect the oil pressure in the interior of the oil pressure cylinder 8.

Also, the speed sensor 23 is used to detect the shaft rotation number of the traveling motor 3, that is, the rotation number n of the traveling motor 3. As shown in FIG. 1, in the controller 24, there is disposed the electromagnetic brake control part 26 which can be actuated when the operation sensor 21 is turned off. In case where the electromagnetic brake control part 26 is made active, the electromagnetic brake control part 26 is put into operation to thereby turn on the electromagnetic brake 17.

Also, the controller 24 includes an electric brake control part 27 which, when the operation sensor 21 is turned on, can be actuated; and, the electric brake control part 27 incorporates therein memory means 27b with data tables a–m stored therein, and a read-out section 27a. Referring to the manner of formation of the data tables a–m, the weight G that is detected by the weight sensor 22 is divided into a given number of stages a–m, and a plurality of data tables a–m are respectively created in correspondence to the thus-divided stages a–m; and, these data tables a–m are used as the above-mentioned plurality of data tables a–m, respectively. In the respective data tables a–m, there are stored not only a given number of stages obtained by dividing the motor rotation number n to be detected by the speed sensor 23 but also the electric brake forces, that is, the plugging forces Dp that are respectively set so as to correspond to their associated stages of the motor rotation number n.

However, alternatively, the data tables a–m may be created in the following manner: that is, the motor rotation number n to be detected by the speed sensor 23 is divided into a given number of stages and thus the present data tables a–m are composed of a plurality of data tables a–m respectively formed so as to correspond to their associated divided stages of the motor rotation number; and, the weight G to be detected by the weight sensor 22 is divided into a given stages and the thus divided stages are respectively stored in their associated data tables a–m and, at the same time, the plugging forces Dp respectively set so as to correspond to the respective stages of the weight G are also stored in their associated data tables a–m. Or, there may be used a single table in which the above-mentioned plurality of data tables a–m are assembled together.

By the way, the number of stages of the weight G and traveling speed v is not limited to a specific number. And, as the stage number increases, the plugging forces Dp can be varied more finely. However, it should be taken into consideration that, as the stage number increases, the number of data tables a–m increases and the number of data of the data tables a–m increases.

The read-out section 27a, in accordance with the weight G and motor rotation number n respectively detected by the weight sensor 22 and speed detect sensor 23, reads the plugging forces Dp corresponding to the thus-detected weight G and motor rotation number n from the data tables a–m, transfers the plugging forces Dp to the motor drive part 28, and the motor drive part 28 electrically brakes the traveling motor 3 so that the plugging forces Dp input to the motor drive part 28 can be obtained.

By the way, the controller 24 includes an accelerator control part 29. That is, in case where the advancing accelerator operation device 14a or a backing accelerator operation device 14b is operated, an off instruction is output from the accelerator control part 29 to the electromagnetic brake drive part 26, so that not only the electromagnetic brake 17 can be switched off but also the traveling motor 3 can be started in the advancing or backing direction. Also, the present accelerator control part 29 is able to adjust the speed of the traveling motor 3 through the motor drive part 28 in correspondence to the operation amount of the advancing accelerator operation device 14a or backing accelerator operation device 14b.

Here, in the data tables a–m, there may be stored the detected values G of the weight sensor 22 and the detected values n of the speed sensor 23, which can be respectively obtained through repeated brake tests conducted by actually traveling and braking the lift truck, and the optimum electric brake forces Dp set so as to correspond to their associated detected values G, n in such a manner that the values G, n and the brake forces Dp correspond to each other. However, in the present embodiment, in order to save the enormous time and labor to be actually consumed for the repeated brake tests, in the data tables a–m, there are stored electric brake forces Dp which are theoretically obtained in such a manner that the following numerical formulas 1 to 6 with respect to the weight G and motor rotation number n can hold.

That is, firstly, between the detected value G of the weight sensor 22 and truck body weight W, there holds a numerical formula 1.

$$W = G \times k + Ws \quad (1)$$

In the numerical formula 1, k expresses a coefficient used to convert G into a loaded weight and Ws expresses the weight of the truck body only.

Also, between the detected value n of the speed sensor 23 and the traveling speed, there holds a numerical formula 2.

$$v = n \times Z \times r \quad (2)$$

In the numerical formula 2, n expresses the rotation number of the traveling motor 3 to be read from the speed sensor 23, z a gear train deceleration ratio (drive deceleration ratio) used to link the drive wheels 5 with the traveling motor 3, and r the effective radius of the respective drive wheels 5, respectively.

Further, between the traveling speed v and brake efficiency, in the case of v≦5 (km/H), there holds a numerical formula 3 and, in the case of v>5 (km/H), there holds a numerical formula 4.

$$F = 9.3 \quad (3)$$

$$F = 1.86 \, v \quad (4)$$

And, between a brake force D necessary to brake the truck body 1 in safe and the brake efficiency F and truck body weight W, there holds a numerical formula 5, and the electric brake force Dp is determined by a numerical formula 6.

$$D = w \cdot g \times 100 (N) \quad (5)$$

In the numerical formula 5, g expresses gravitational acceleration which is defined as 9.8 (m/s2).

$$Dp = D - Dd = F \cdot W \cdot g \times 100 - Dd \quad (6)$$

In the numerical formula 6, Dd expresses a brake force which can be obtained from the brake torque of the electromagnetic brake 17 and is defined as a constant value. That is, in the case of the traveling speed of 5 km/H or less, the electric brake force Dp is obtained as shown in the following numerical formula 7.

$$Dp = (9.3(G \times k + Ws) \cdot g \times 100 - Dd) \times K' \quad (7)$$

The plugging force Dp increases or decreases in proportion to an increase or a decrease in the load regardless of the traveling speed, and thus the truck body is braked with a small brake force which is the difference obtained when the difference between the maximum plugging force and the plugging force in the numerical formula 7 is subtracted from the maximum brake force necessary in the maximum load highest speed condition. By the way, in the numerical formula 7, K' expresses a safety coefficient.

Also, in the case of the traveling speed of more than 5 km/H, the electric brake force Dp is obtained as shown in the following numerical formula 8.

$$Dp = (1.86 \, v(G \times k + Ws) \cdot g \times 100 - Dd) \times K' \quad (8)$$

The plugging force Dp not only increases or decreases in proportion to an increase or a decrease in the load but also increases or decreases in proportion to an increase or a decrease in the traveling speed.

Figure 2:
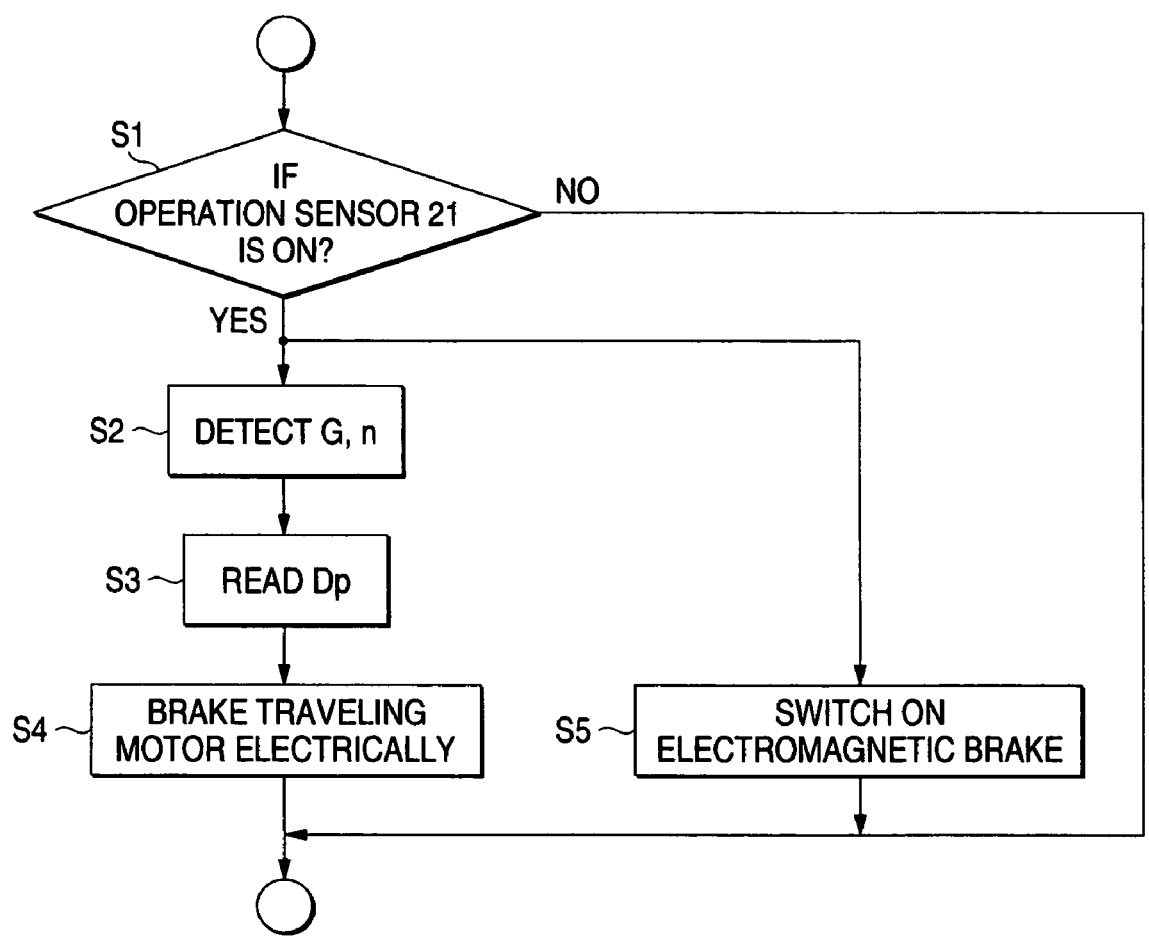
FIG. 2 is a flow chart of a control program to be executed in the first embodiment.

Now, FIG. 2 is a flow chart of a brake control program which is stored in and executed by the brake controller 20, and description will be given below of the operation of the brake controller 20 with reference to FIG. 2.

In the routine of the brake control program, firstly, it is checked whether the operation sensor 21 is on or off (S1) and, if it is found on, then the weight G of the weight sensor 22 and the motor rotation number n of the speed sensor 23 are detected (S2). Then, in accordance with the thus-detected G and n, the read-out section 27a reads the plugging force Dp from the data tables a–m of the storage means 27b (S3) and the thus-read plugging force Dp is transferred to the motor drive part 28; and, on receiving the plugging force Dp, the motor drive part 28 plugs the traveling motor 3 in such a manner that this plugging force Dp can be obtained (S4).

Also, in case where the operation sensor 21 is turned on, the electromagnetic brake control part 25 is actuated in parallel to this plugging operation to thereby switch on the electromagnetic brake 17 through the electromagnetic brake drive part 26, so that the electromagnetic brake 17 brakes the rotation of the traveling motor 1 together with the electric brake to be executed by the plugging operation (S5).

By the way, from the above-mentioned numerical formulas 1 and 4, it is clear that the brake force D necessary to stop the truck body 1 safely increases or decreases in proportion to the sizes of the loads; and also, from the numerical formulas 2, 3, and 4, it is clear that the brake force D increases or decreases in correspondence to an increase or a decrease in the traveling speed.

In the present embodiment, as described above, since the plugging force Dp increases or decreases in correspondence to an increase or a decrease in the load as well as an increase or a decrease in the traveling speed, there can be obtained the optimum brake force D that corresponds to the load and running speed and thus, even in the low-speed no-load condition and in the low-speed light-load condition, the truck body 1 can be braked with the optimum brake force D. Therefore, even in the light-load condition, the sudden stop of the truck body 1 can be prevented, thereby being able to eliminate a fear that the cargo carried on the lift truck can collapse due to such sudden stop.

Also, when compared with a second embodiment according to the invention which will be discussed below, not only the structure of the electric brake control part 27 according to the first embodiment is simple, but also the operation time thereof is short to thereby be able to realize quick braking.

Figure 6:
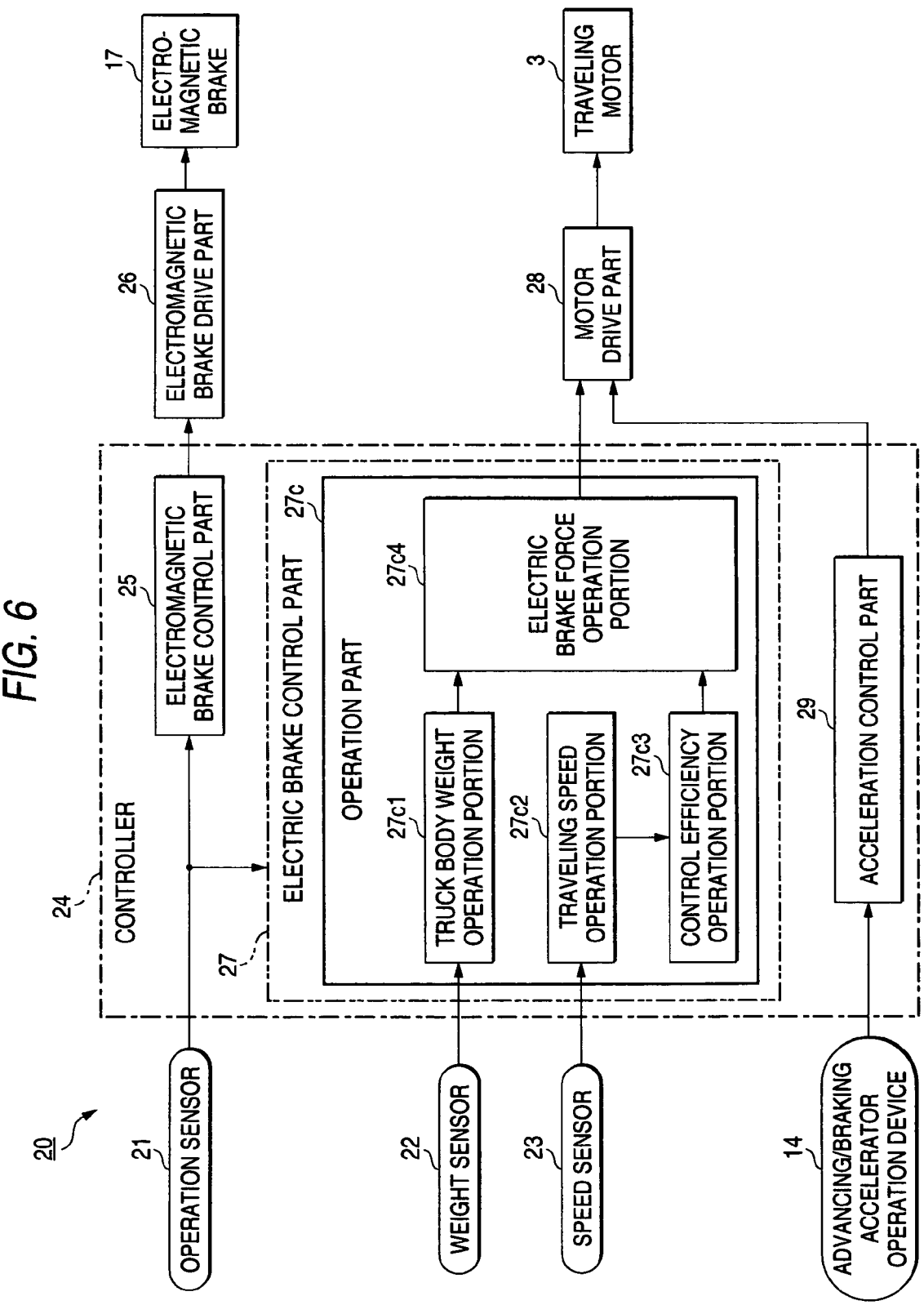
FIG. 6 is a function block diagram of the main portions of a lift truck according to a second embodiment of the invention.

Now, FIG. 6 is a function block diagram of a brake control part 20 of a lift truck according to a second embodiment of the invention. In the present brake control part 20, as shown in FIG. 6, instead of the storage means 27b used in the first embodiment, there is employed an operation part 27c.

This operation part 27c comprises a truck body weight operation portion 27c1, a traveling speed operation portion 27c2, a control efficiency operation portion 27c3, and an electric brake force operation portion 27c4. In the truck body weight operation portion 27c1, based on the output of the weight sensor 22, the body truck weight W is calculated according to the above-mentioned numerical formula 1, namely, the below-mentioned numerical formula 9.

$$W = G \times k + Ws \quad (9)$$

Also, in the traveling speed operation portion 27c2, based on the motor rotation number n detected by the speed detect sensor 23, the traveling speed v is calculated according to the above-mentioned numerical formula 2, namely, the below-mentioned numerical formula 10.

$$v = n \times Z \times r \quad (10)$$

Further, the control efficiency operation portion 27c3, using the traveling speed v operated by the traveling speed operation portion 27c2, decides a brake efficiency F which is used to calculate a brake force. That is, in case where the traveling speed v is 5 (km/H) or less, the control efficiency operation portion 27c3 decides the brake efficiency F such that F=9.3; and, in the case of the traveling speed v of more than 5 (km/H), the operation portion 27c3 decides the brake efficiency F according to the above-mentioned numerical formula 3, namely, the below-mentioned numerical formula 11.

$$F = 1.86 \, v \quad (11)$$

By the way, the highest traveling speed of this lift truck is set at 13.4 km/H. Now, the electric brake force operation portion 27c4, using not only the brake efficiency F decided by the control efficiency operation portion 27c3 but also the truck body weight W calculated by the truck body weight operation portion 27c1, calculates a brake force D (unit is N) necessary to brake the lift truck safely according to the above-mentioned numerical formula 5, namely, the below-mentioned numerical formula 12; and, further, the operation portion 27c4, using the thus-calculated brake force D, calculates a plugging force Dp according to the above-mentioned numerical formula 6, namely, the below-mentioned numerical formula 13.

$$D = F \cdot W \cdot g \times 100 \quad (12)$$

$$Dp = D - Dd \quad (13)$$

Here, if the right side of the numerical formula 12 is substituted for D of the right side of the numerical formula 5, then there is obtained the following numerical formula 14.

$$Dp = F \cdot W \cdot g \times 100 - Dd \quad (14)$$

Accordingly, in the electric brake force operation portion 27c4, the electric brake force may be calculated according to this numerical formula 14.

The plugging force Dp calculated in the electric brake force operation portion 27c4 is transferred to the motor drive part 28 and the motor drive part 28 plugs the traveling motor 3 in such a manner that this plugging force Dp can be obtained.

Figure 7:
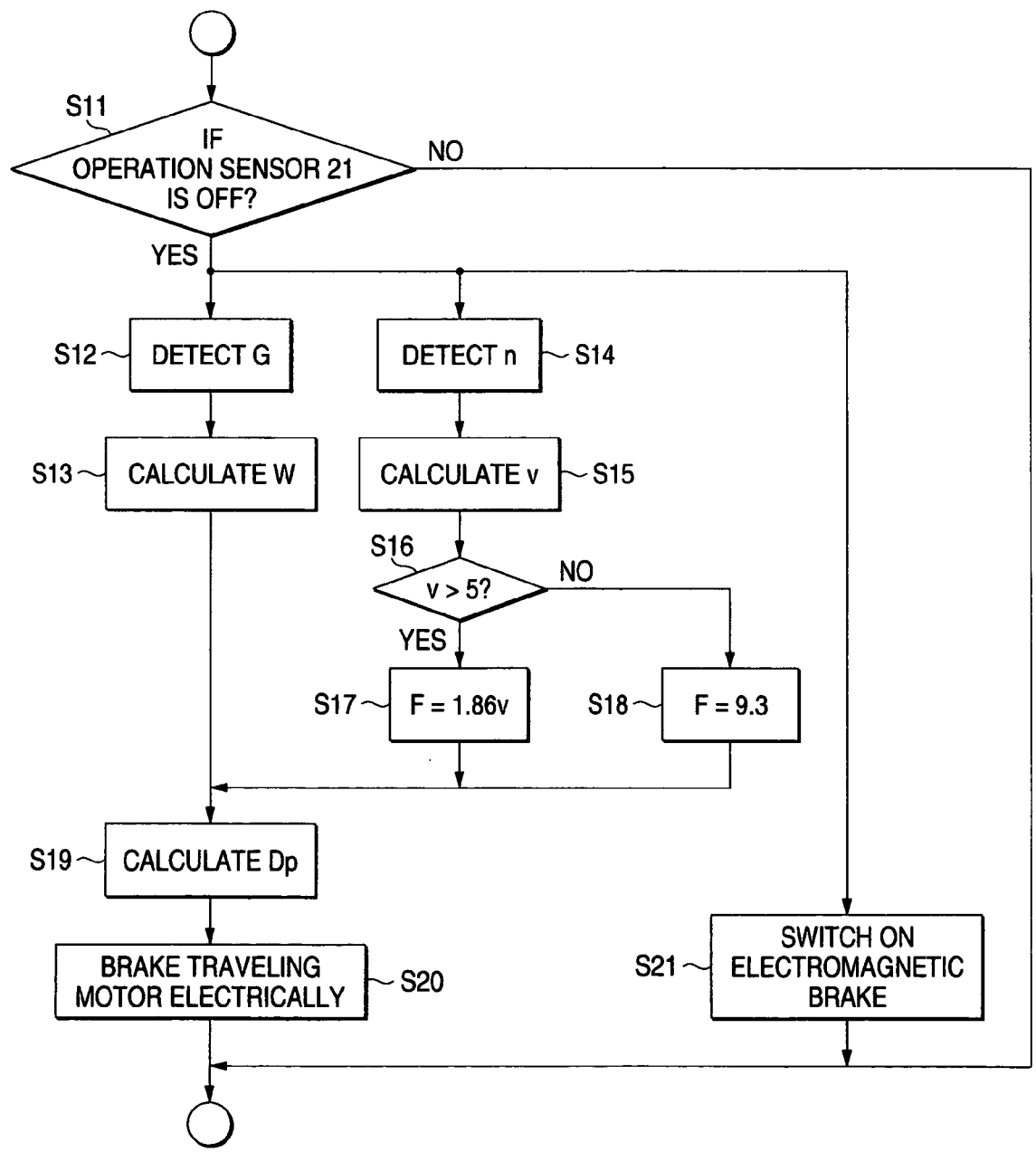
FIG. 7 is a flow chart of a control program to be executed in the second embodiment.

Now, FIG. 7 is a flow chart of a control program of the present brake control part 20. Description will be given below of the control program of the present brake control part 20 with reference to FIG. 7. Firstly, in case where the brake operation device 10 is raised up to its vertical position by the operation sensor 21 or is lowered down to its horizontal position to thereby turn off the operation sensor 21 (S11), the weight G detected by the weight sensor 22 is detected (S12) and the truck body weight W is calculated by the truck body weight operation part 27c1 (S13). Also, in parallel to this, if the operation sensor 21 is turned off (S13), the motor rotation number n to be detected by the speed sensor 23 is detected (S14), the traveling speed v is calculated by the traveling speed operation portion 27c2 (S15), and further, using this calculation result, the brake efficiency F is decided by the control efficiency operation portion 27c3.

In the control efficiency operation portion 27c3, it is checked whether the traveling speed v is more than 5 or not (S16). If it is found more than 5, then the value calculated according to the numerical formula 3 is decided as the brake efficiency F (S17); and, if it is found 5 or less, then the brake efficiency F is decided as 9.3 (S18).

After then, using not only the truck body weight W calculated in the truck body weight operation portion 27c1 but also the brake efficiency F calculated in the control efficiency operation portion 27c3, the electric brake force operation portion 27c4 calculates the plugging force Dp according to the numerical formulas 4 and 5, or according to the numerical formula 6 (S19). The motor drive part 28, on receiving the thus calculated value, plugs the traveling motor 3 in such a manner that there can be obtained the above-calculated plugging force Dp (S20). Also, if the brake-on operation is detected (S11), then the electromagnetic brake control part 25 is turned on to thereby actuate the electromagnetic brake drive part 26, so that the electromagnetic brake 17 is switched on (S21).

By the way, it is clear from the numerical formulas 9 and 12 that the brake force D necessary to stop the truck body 1 safely increases or decreases in proportion to the sizes of the loads, that is, in proportion to an increase or a decrease in the load, namely, in proportion to an increase or a decrease in the cargo carried on the lift truck; and also, it is clear from the numerical formulas 10, 11 and 12 that the brake force D increases or decreases in correspondence to an increase or a decrease in the traveling speed.

In the present embodiment, as described above, not only the traveling motor 3 is braked by the electromagnetic brake 17 having a brake force Dd which is set at a constant value, but also the traveling motor 3 is electrically braked with a brake force Dp which increases or decreases in correspondence to an increase or a decrease in the load as well as an increase or a decrease in the traveling speed, thereby being able to obtain the optimum brake force D that corresponds to the load and traveling speed of the lift truck. Thanks to this, even in the low-speed and light-load condition, the truck body 1 can be braked with the optimum brake force D. This can prevent the truck body 1 from stopping suddenly in such condition, thereby being able to eliminate the fear that the cargo carried on the lift truck can be caused to collapse due to such sudden stop.

Figure 8:
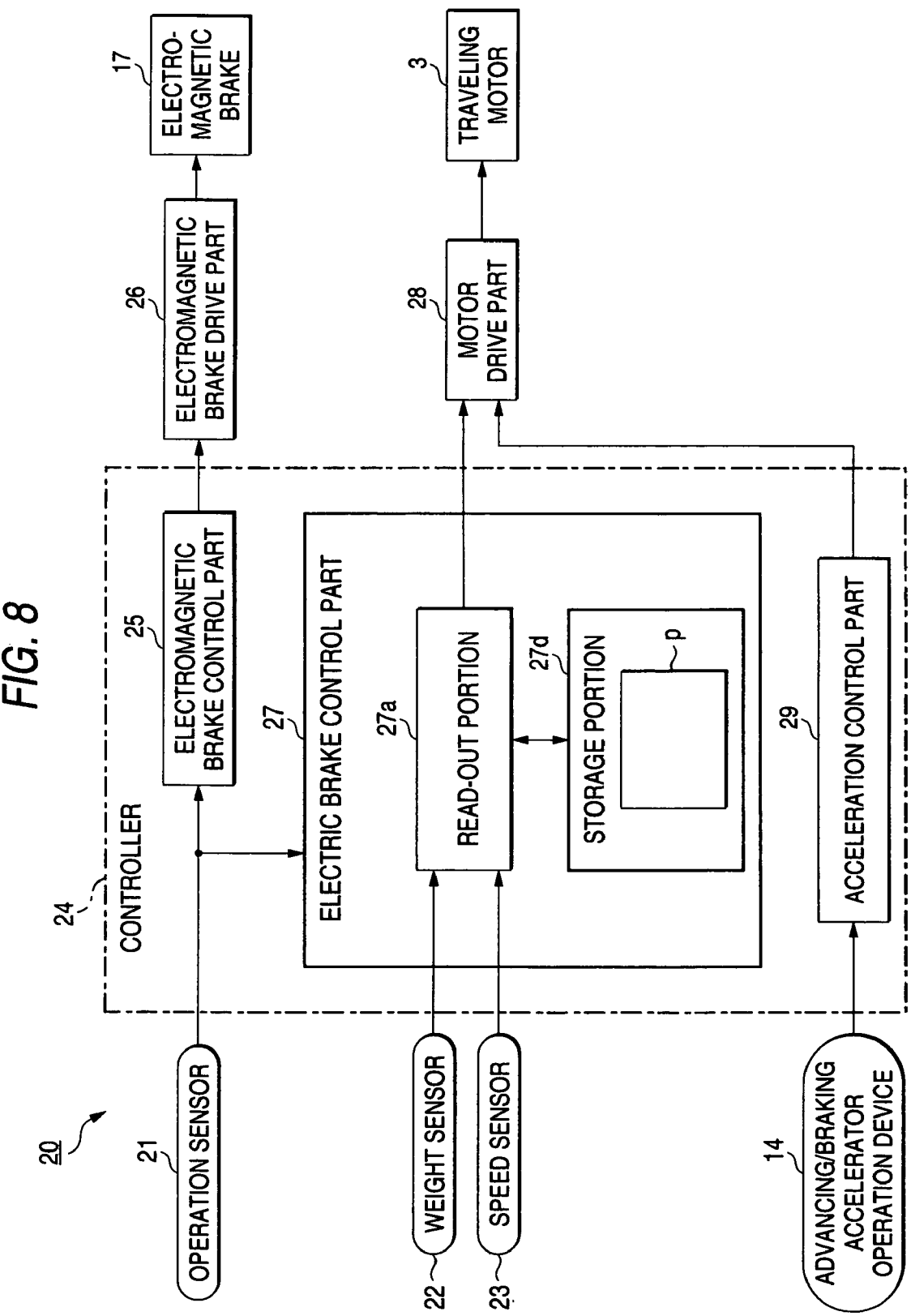
FIG. 8 is a function block diagram of the main portions of a lift truck according to a third embodiment of the invention.

Also, according to the present embodiment, the plugging force Dp can be continuously varied in correspondence to the weight G and traveling speed v which vary continuously. Now, FIG. 8 is a block diagram of a brake controller 20 of a lift truck according to a third embodiment of the invention. As shown in FIG. 8, the present a brake controller 20 includes storage means 27*d* having a data table p, instead of the storage means 27*b* employed in the first embodiment or instead of the operation part 27*c* employed in the second embodiment.

According to the present embodiment, the weight G to be detected by the weight sensor 22 is divided into a given number of stages, and the respective stages of the weight G and plugging forces Dp corresponding to these stages are respectively stored in this data table p.

Figure 9:
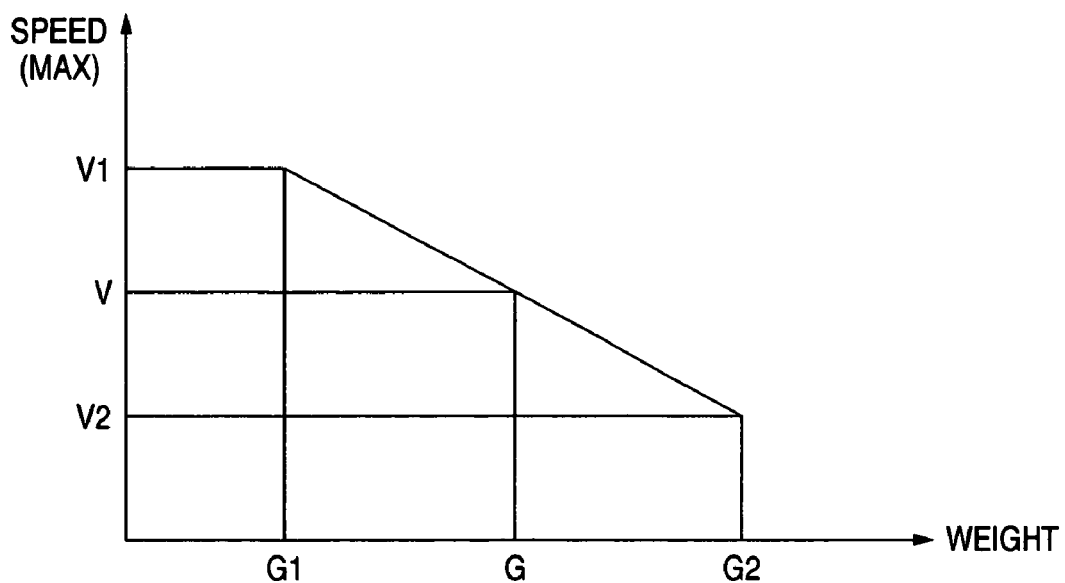
FIG. 9 is a graphical representation of the relation between weight and speed according to the invention.

Here, between the weight G and traveling speed v, there holds the relation shown by the following numerical formula 15 instead of the above-mentioned numerical formula 2, that is, there holds the relation shown in FIG. 9.

$$v=(v1-v2)(G1-G2)/(G2-G1)+v2 \qquad (15)$$

In the numerical formula 15, v1 expresses a traveling speed in a no-load condition, v2 a traveling speed in a full-load condition, G1 the detected value of the weight sensor 22 in a no-load condition, and G2 the detected value of the weight sensor 22 in a full-load condition, respectively. And, the weight G and plugging force Dp are made to correspond to each other in such a manner that the relations respectively shown by the above-mentioned numerical formulas 1, 3, 4, 5, 6, 7 and 8 can hold.

Figure 10:
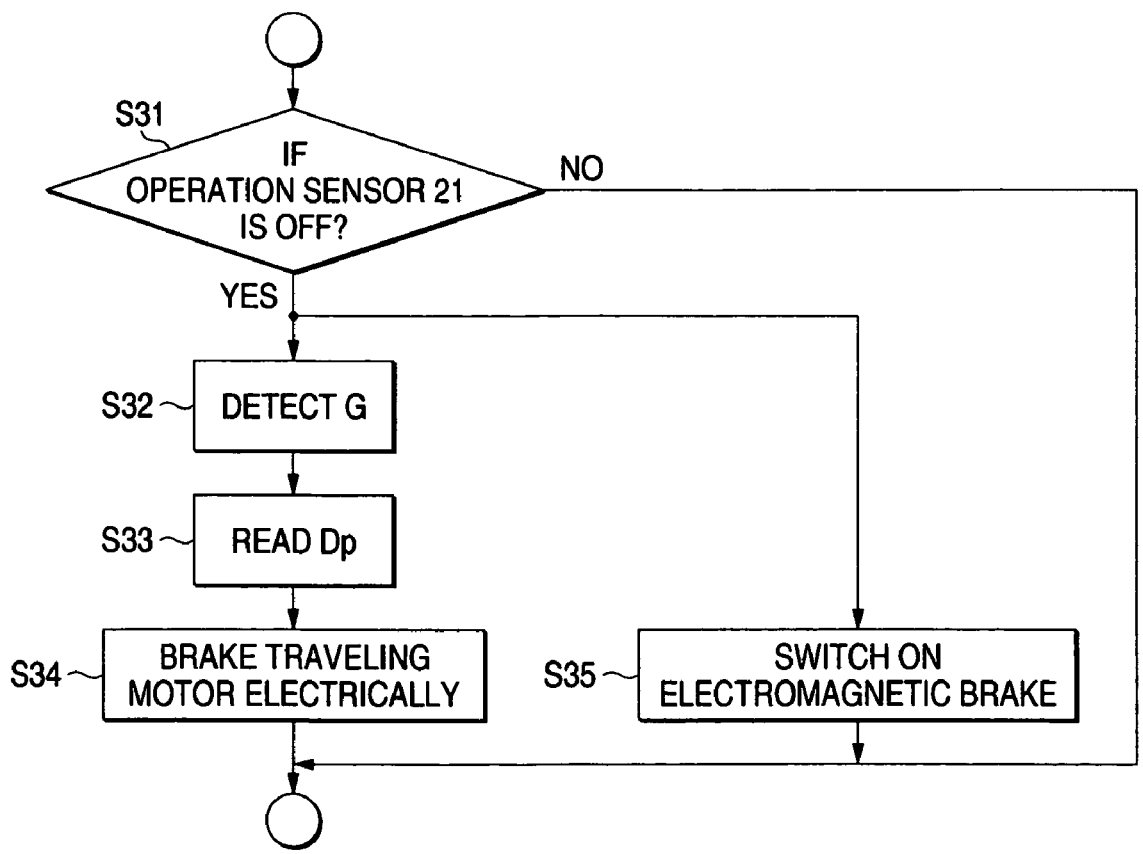
FIG. 10 is a flow chart of a control program to be executed in the third embodiment.

And, according to the present embodiment, there is omitted the speed sensor 23 that is employed in the previously described embodiments and, based on the detected value of the weight sensor 22, the plugging force Dp is decided in a similar procedure to the first embodiment. That is, FIG. 10 is a flow chart of the brake control program of the present a brake controller 20. As shown in FIG. 10, when this brake control routine is started, if it is confirmed that the operation sensor 21 is on (S31), then the weight sensor 22 detects the weight G (S32), the read-out section 27*a* reads out the plugging force Dp corresponding to the thus-detected weight G from the data table p of the storage means 27*d* (S33), and the motor drive part 28, to which the plugging force Dp has been transferred as a decided value, plugs the traveling motor 3 in such a manner that there can be obtained this plugging force Dp (S34).

By the way, similarly to the previously described embodiments, the electromagnetic brake 17 is switched on (S35) in parallel to this plugging operation.

Figure 11:
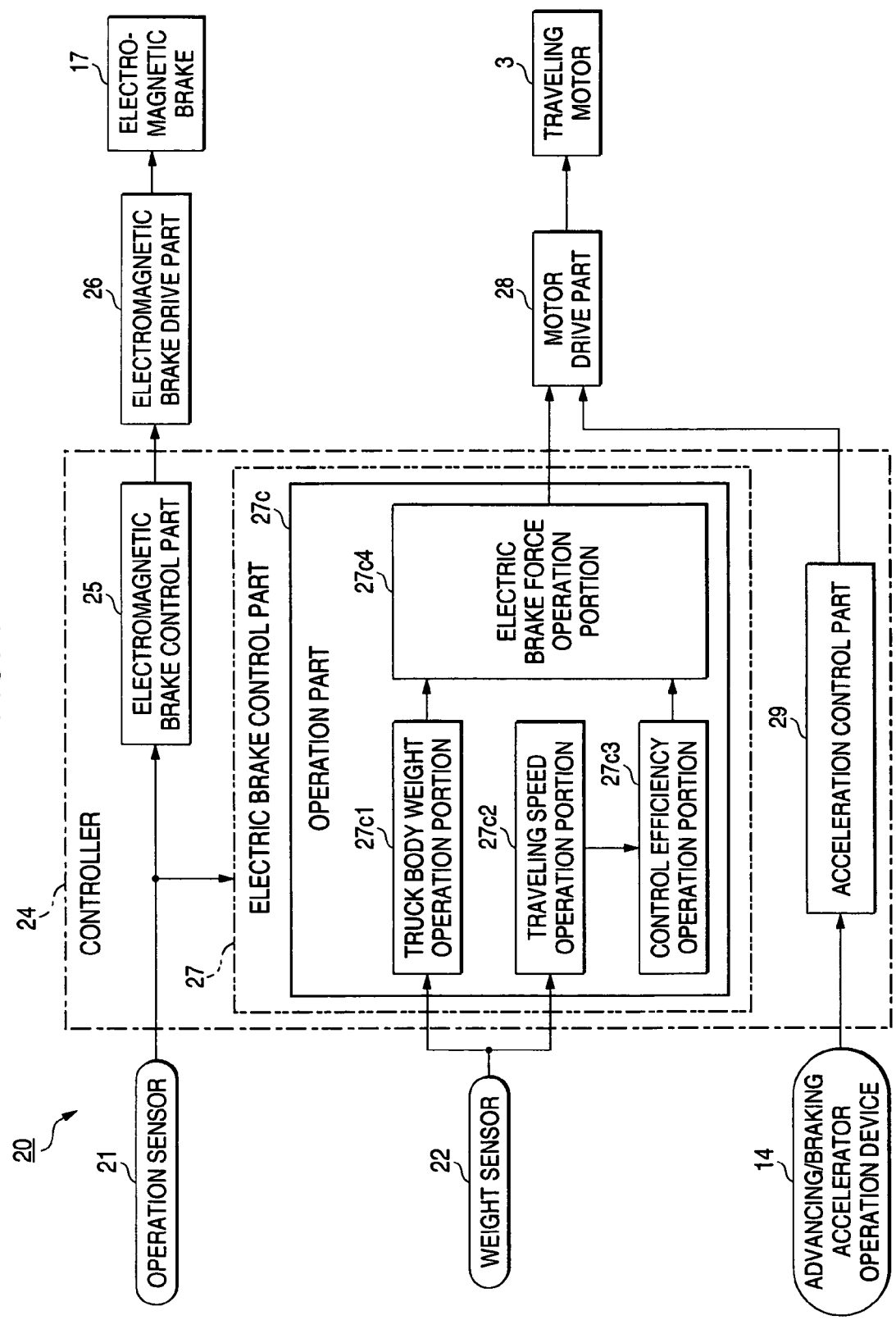
FIG. 11 is a function block diagram of the main portions of a lift truck according to a fourth embodiment of the invention.

The remaining portions of the structure, operation and effects of the present embodiment are similar to those of the first embodiment and thus the detailed description thereof is omitted here. Now, FIG. 11 is a function block diagram of a brake controller 20 of a lift truck according to a fourth embodiment of the invention. This a brake controller 20 is similar in structure to the second embodiment previously described with reference to FIGS. 6 and 7, except that it does not include a speed sensor, a traveling speed operation portion 27*c*2 inputs the detected value G of the weight sensor 22 and calculates the traveling speed v according to the above-mentioned numerical formula 15.

Figure 12:
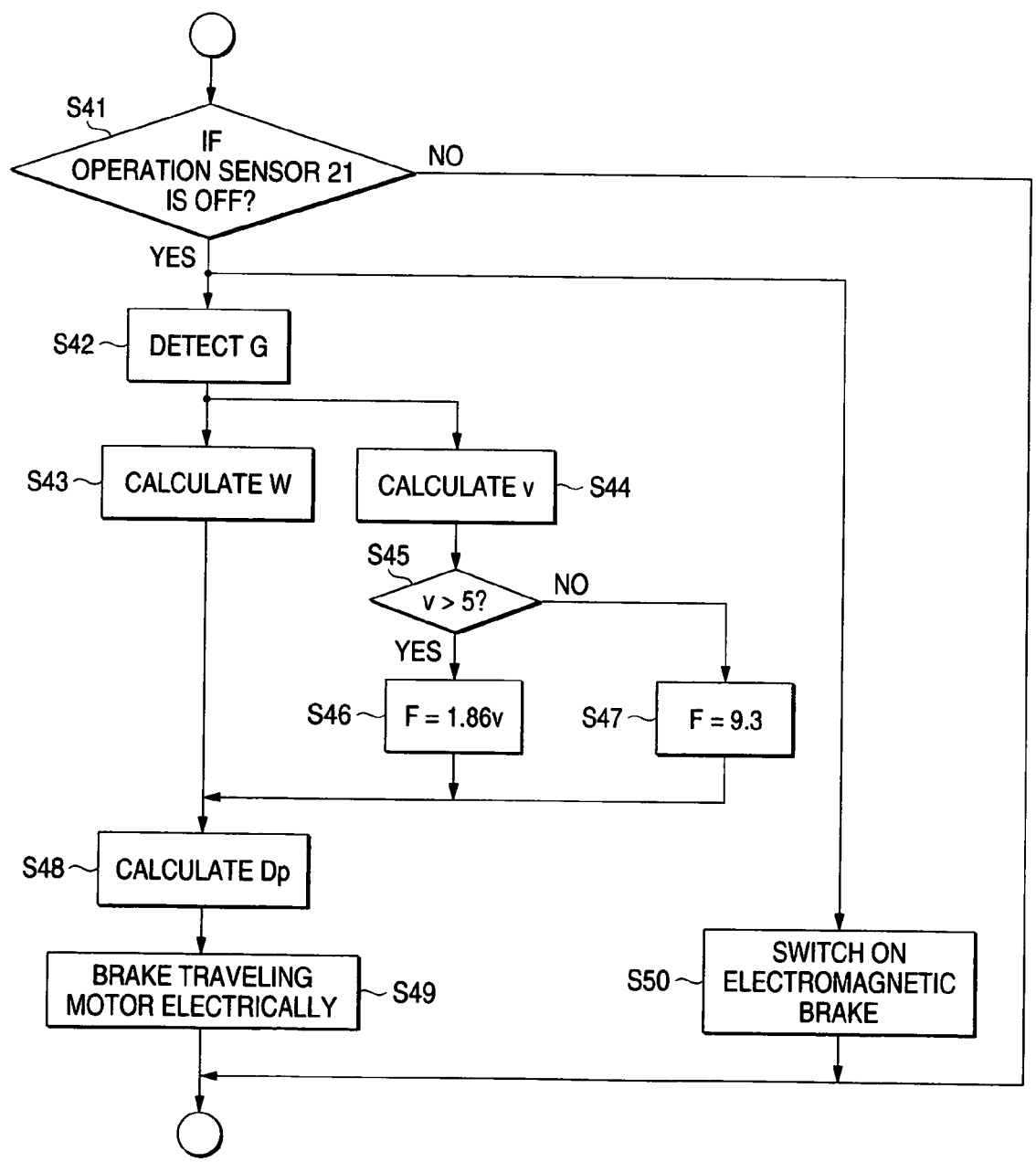
FIG. 12 is a flow chart of a control program to be executed in the fourth embodiment.

Now, FIG. 12 is a flow chart of a brake control program stored in the brake controller 20. As shown in FIG. 12, in this routine, if the operation sensor 21 is found on (S41), then the weight G of the weight sensor 22 is detected (S42); using the thus-detected weight value, the truck body weight operation portion 27*c*1 calculates the truck body weight W according to the numerical formula 1 (S43); in parallel to this calculation, using the detected weight value of the weight sensor 22, the traveling speed detect portion 27*c*2 calculates the traveling speed v according to the numerical formula 15 (S44); and, the brake efficiency operation portion 27*c*3 checks whether the thus-calculated traveling speed v exceeds 5 or not (S45). And, if the traveling speed v is found more than 5, the brake efficiency F is decided according to the numerical formula 4 (S46); and, if the traveling speed v is found equal to or less than 5, the brake efficiency F is decided as 9.3 (S47). After then, using the truck body weight W calculated by the truck body weight operation portion 27*c*1 and the brake efficiency F decided by the brake efficiency operation portion 27*c*3, the electric brake force operation portion 27*c*4 calculates the electric brake force Dp (S48). The remaining procedures (S49, S 50) of the present brake control program are similar to the brake control program shown in FIG. 7 and, the remaining portions of the operation and effects of the present embodiment are similar to those of the second embodiment previously described with reference to FIGS. 6 and 7.

Although description has been given heretofore of the lift truck of a type that an operator does not get on the truck body, the first and second inventions can also apply to a lift truck of a type that an operator gets on the truck body. And, when the first and second inventions are applied to the lift truck of a type that an operator gets on the truck body, the sudden stop of the lift truck in a low-speed condition as well as in a light-load condition can be prevented. This not only can prevent the cargo carried on the lift truck from collapsing, but also can prevent the operator from feeling uncomfortable and can prevent the operator from operating the operation lever unconsciously due to the sudden stop of the lift truck or due to the reaction to such sudden stop.

Also, in the above-mentioned respective embodiments, the plugging force is increased or decreased only in correspondence to the cargo weight and traveling speed or in correspondence to the cargo weight. However, this is not limitative, but the plugging force may also be increased or decreased only in correspondence to the traveling speed.

Of course, the electric brake operation according to the invention contains not only the plugging operation described hereinabove but also a regenerative brake operation.

As has been described heretofore, the first invention is structured such that the brake controller, when it detects the brake operation of the brake operation device, not only actuates the electromagnetic brake but also detects the truck body weight of the present lift truck, thereby being able to electrically brake the traveling motor in correspondence to the thus-detected truck body weight. Therefore, according to the first invention, since the brake force can be increased or decreased according to whether the load is heavy or light, not only the sudden stop of the truck body in the no-load condition and in the light-load condition can be prevented but also the collapse of the cargo due to the sudden stop in the light-load condition can be prevented.

Also, according to the first invention, because the brake of electromagnetic brake and the electric brake of the traveling motor are used in combination, the output of the electromagnetic brake can be reduced, thereby being able to use an electromagnetic brake which is smaller in size and weight as well as is more compact than the conventional electromagnetic brake.

Further, when the first invention is applied to a lift truck of a type that an operator gets on it, the collapsed posture of the operator caused by the sudden stop of the truck body in the no-load condition and in the light-load condition can be prevented. This not only can prevent the operator from feeling uncomfortable, but also can prevent the operator from unconsciously operating the operation device due to the sudden stop of the truck body or due to a reaction to such sudden stop.

Next, the second invention is structured such that the brake controller, when it detects the brake operation of the brake operation device, not only actuates the electromagnetic brake but also detects the traveling speed of the present lift truck, thereby being able to electrically brake the traveling motor in correspondence to the thus-detected traveling speed. Therefore, since the brake force can be increased or decreased according to whether the traveling speed is high or low, not only the sudden stop of the truck body in the low-speed traveling condition can be prevented but also the collapse of the cargo due to the sudden stop in the low-speed condition can be prevented.

Also, according to the second invention, because the brake of the electromagnetic brake and the electric brake are used in combination, the output of the electromagnetic brake can be reduced, thereby being able to use an electromagnetic brake which is smaller in size and weight as well as is more compact than the conventional electromagnetic brake.

Further, when the second invention is applied to a lift truck of a type that an operator gets on it, the collapsed posture of the operator caused by the sudden stop of the truck body in the low-speed condition can be prevented. This not only can prevent the operator from feeling uncomfortable, but also can prevent the operator from unconsciously operating the operation device due to the sudden stop of the truck body or due to a reaction to such sudden stop.

The invention claimed is:

1. A lift truck comprising:
   a truck body;
   a traveling motor for traveling the truck body;
   an electromagnetic brake for braking rotation of the traveling motor;
   a brake operation device to be operated for actuation of the electromagnetic brake; and,
   a brake controller for detecting the brake operation of the brake operation device to actuate the electromagnetic brake,
   the brake controller comprising:
   an operation sensor for detecting operation of the brake operation device;
   a speed sensor detecting the traveling speed of the truck body;
   a controller for deciding the value of an electric brake force of an electric brake in accordance with the detected value of the speed sensor; and
   a motor drive part for inputting therein the value of the electric brake force to electrically brake the traveling motor,
   wherein the brake controller, when it detects the brake operation of the brake operation device, actuates the electromagnetic brake, detects the traveling speed of the truck body, and electrically controls the traveling motor in accordance with the decided value such that the electric brake force is increased or decreased in correspondence to the detected traveling speed of the truck body.

2. A lift truck as set forth in claim 1, wherein the controller includes;
   a data table containing detection values of the speed sensor and electric brake force values respectively corresponding to the detection values; and
   a read-out section for reading out one of the electric brake force values from the data table based on the detected value of the speed sensor,
   wherein the one of the electric brake force values is transferred to the motor drive part as a decided value.

3. The lift truck as set forth in claim 1, wherein the controller further comprises:
   an operation part for calculating the electric brake force based on the detected value of the speed sensor,
   wherein the calculation result of the operation part is transferred to the motor drive part as a decided value.

4. The lift truck as set forth in claim 3, wherein the operation part comprises:
   a traveling speed operation portion for calculating the traveling speed based on the detected value of the speed sensor, a brake efficiency operation portion for calculating a brake efficiency based on the calculation result of the traveling speed operation portion; and
   an electric brake force operation portion for calculating the electric brake force based on the calculation result of the brake efficiency operation portion,
   wherein the calculation result of the electric brake force operation portion is transferred to the motor drive part as a decided value.

5. A lift truck as set forth in claim 1, wherein the electric brake is a plugging or regenerative brake.

* * * * *